United States Patent [19]

Mayse et al.

[11] 4,226,689
[45] Oct. 7, 1980

[54] APPARATUS AND PROCESS FOR ELECTRICALLY RESOLVING EMULSIONS

[75] Inventors: Weldon D. Mayse; Frederick D. Watson, both of Houston, Tex.

[73] Assignee: Petrolite Corporation, St. Louis, Mo.

[21] Appl. No.: 43,551

[22] Filed: May 29, 1979

[51] Int. Cl.³ .................. B03C 5/00; C10G 33/02
[52] U.S. Cl. ............................ 204/188; 204/302
[58] Field of Search .................. 204/186–191, 204/302

[56] References Cited

U.S. PATENT DOCUMENTS

| | | | |
|---|---|---|---|
| 1,405,120 | 1/1922 | Harris | 204/306 |
| 1,440,776 | 1/1923 | Eddy | 204/302 |
| 1,480,064 | 1/1924 | Harris | 204/189 |
| 1,581,205 | 4/1926 | Harris | 204/188 |
| 1,606,699 | 11/1926 | De Groote | 204/188 |
| 1,754,009 | 4/1930 | Cage | 204/306 |
| 1,838,376 | 12/1931 | Eddy | 204/189 |
| 1,838,847 | 12/1931 | Lawrason | 204/188 |
| 1,838,924 | 12/1931 | Fisher | 204/189 |
| 1,838,937 | 12/1931 | Girvin | 204/302 |
| 1,887,010 | 11/1932 | Cage | 204/302 |
| 1,891,645 | 12/1932 | Howes | 204/302 |
| 2,033,152 | 3/1936 | Roberts | 204/188 |
| 2,033,418 | 3/1936 | Eddy | 204/302 |
| 2,033,419 | 3/1936 | Eddy | 204/302 |
| 2,047,538 | 7/1936 | Woelflin | 204/189 |
| 2,061,197 | 11/1936 | Kiech | 204/188 |
| 2,098,982 | 11/1937 | St. Hill | 204/188 |
| 2,108,258 | 2/1938 | Fisher | 204/188 |
| 2,108,259 | 2/1938 | Cage | 204/302 |
| 2,110,899 | 3/1938 | Woelflin | 204/190 |
| 2,277,513 | 3/1942 | Eddy | 204/302 |
| 2,425,355 | 8/1947 | Roberts | 204/304 |
| 3,207,686 | 9/1965 | Jarvis et. al. | 204/302 |
| 3,232,860 | 2/1966 | Waterman | 204/306 |
| 3,347,773 | 10/1967 | Turner | 204/302 |
| 3,582,527 | 6/1971 | Lucas | 204/302 |

Primary Examiner—T. M. Tufariello
Attorney, Agent, or Firm—Sidney B. Ring; Hyman F. Glass

[57] ABSTRACT

An electric treater and process for electrically resolving emulsions into organic and aqueous phases. The treater includes a horizontally positioned, planar, permeable electrode which is the only electrode means positioned in the treater. The interface between the bodies of organic and aqueous material which collect in the treater is kept at a position intermediate the electrode and a distributor means for introducing emulsion into the treater. The emulsion is resolved at the water surface, which serves as a grounded electrode.

15 Claims, 10 Drawing Figures

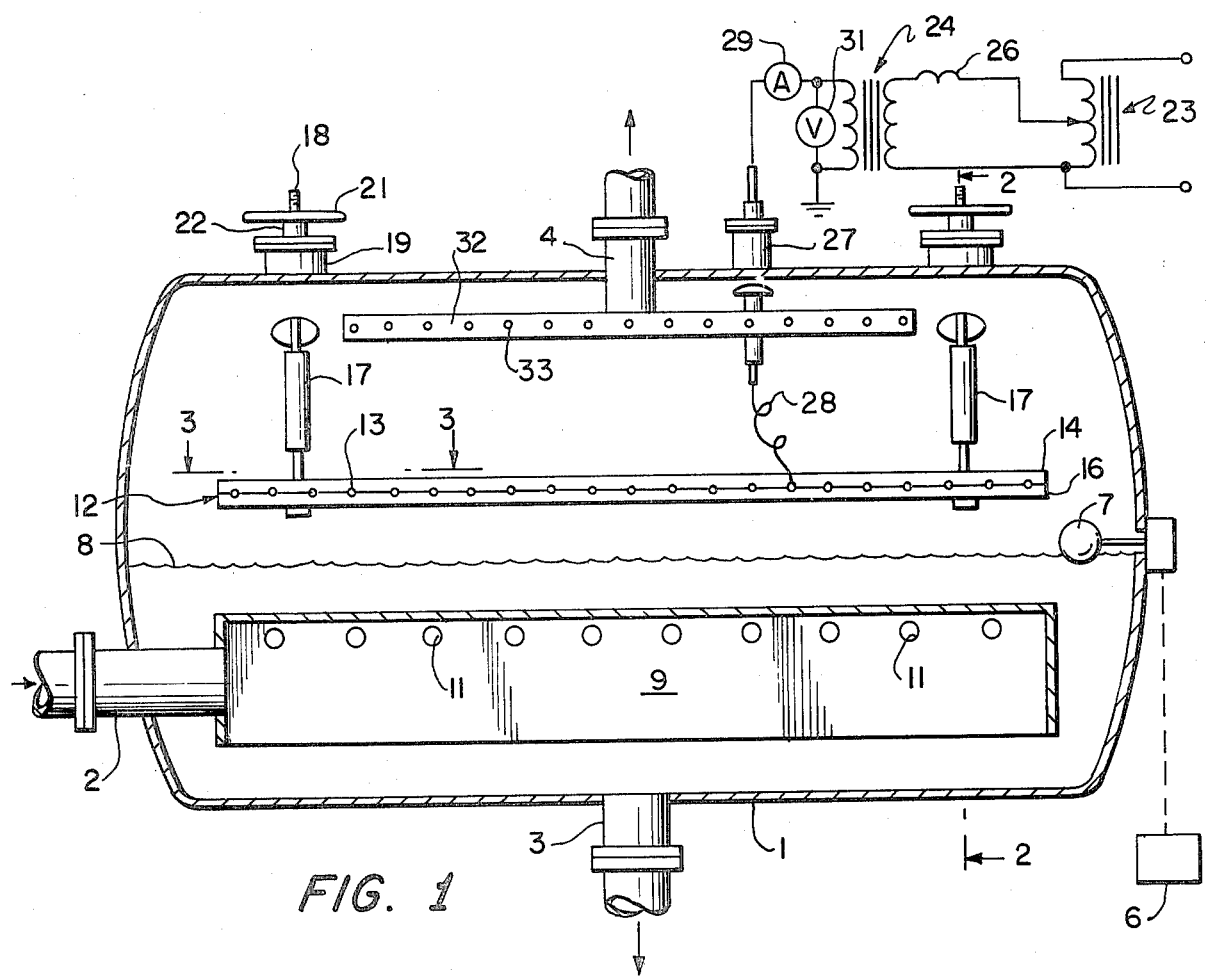
FIG. 1
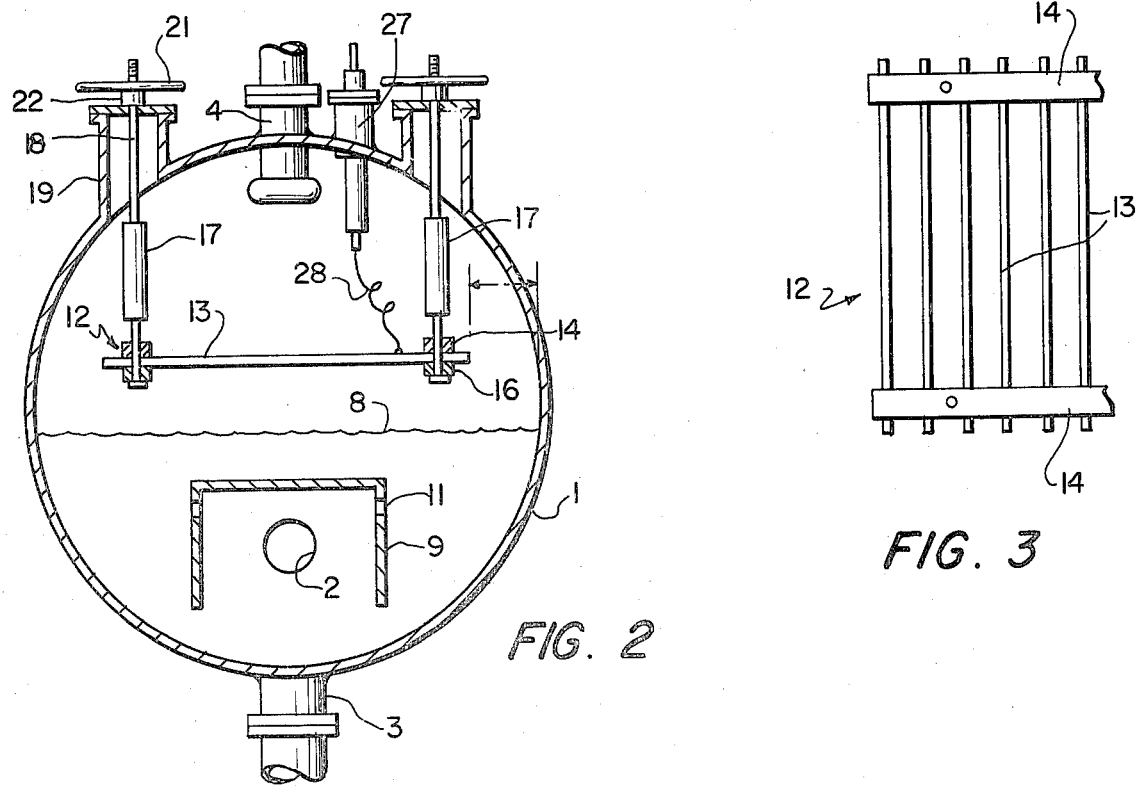
FIG. 2
FIG. 3

APPARATUS AND PROCESS FOR ELECTRICALLY RESOLVING EMULSIONS

BACKGROUND OF THE INVENTION (1) Field of the Invention

This invention relates to resolving emulsions by electric field treatment and apparatus therefor.

As used herein, the term "emulsion" is used to include dispersions resembling emulsions as well as true emulsions. The emulsions to which this invention relates may be categorized as formed of immiscible external and internal liquid phases, the internal phase being an aqueous material and the external phase an organic material. The internal aqueous phase has a higher dielectric constant and conductivity than the external organic phase.

The aqueous material may contain various water-soluble impurities such as chloride ions, and non-soluble salts or inorganic solids, such as sand, entrained therein.

The emulsion subjected to electrical treatment for its resolution may already exist as a stream from a natural source, or a stream associated with a production facility such as an oil refinery or a plant arranged for production of synthetic chemicals or other materials. However, the emulsion may be formed artificially, or further altered, by mixing an aqueous medium with the liquid organic material.

This invention relates more specifically to the resolution of emulsions formed between water and highly conductive, high viscosity and low API gravity crude oils.

(2) Description of the Prior Art

Electric fields are employed for resolving many emulsions in which the internal phase is an aqueous material such as water, caustic, or acid, etc., and the external phase is an organic liquid material such as crude oil. These emulsions are passed between electrodes energized with a high voltage to create an electric field that causes the internal phase to coalesce. The term "coalesce" as used herein refers to the agglomeration of the dispersed internal phase while in the continuous external phase. Sufficiently large particle sizes of the internal phase are created which can be readily separated from the external phase by differences in specific gravities.

Conventional "electric field" techniques for resolving water and crude oil emulsions require an electric field of certain potential gradient magnitudes for the electric treatment of the emulsion to be considered practical. For example, the high voltage applied to the electrodes in conventional treaters is generally between about 11,000 volts and about 33,000 volts, or even higher. Usually, the electrodes are spaced apart from about 4 to about 11 inches. Thus, conventional practices generally produce treating potential gradients from about 2.5 kv to about 8.5 kv per inch spacing between electrodes. This electrode-spacing, high voltage criterion of potential gradient exists whether all electrodes are energized or whether some electrodes are energized and others are grounded.

In carrying out these conventional electric treatments fro resolving emulsions, a variety of treaters were developed. These are two main types, which may be termed high velocity and low velocity treaters, respectively. Examples of high velocity treaters are those described in the following U.S. Pat. Nos. 2,443,646, 2,527,690, 2,543,996, 2,557,847, 2,880,158, and 2,894,895. Examples of low velocity treaters are those described in the following U.S. Pat. Nos. 2,033,129, 2,033,137, 2,098,982, 2,102,051, 3,396,100, 3,458,429, 3,369,500 and 3,672,511. Among other U.S. patents describing electric treaters of the conventional type are: U.S. Pat. Nos. 2,182,145, 2,855,356, 2,976,228, 3,205,160 and 3,205,161.

Treaters of conventional design have given satisfactory service in most applications. However, in a number of situations, especially where more conductive, viscous and low API gravity crude oils are encountered, the electrical power consumption of the treater is excessive and erratic. In some treater applications, the electrical stability is severely affected by large current flows that cause the protective devices on the treater to remove, or reduce, operating potentials from the energized electrode(s). Where treating did occur, the efficiency of emulsion resolution in these electric treaters was adversely affected because the electric treatment was not maximized. More importantly, a change in voltage, flow rate, temperature or other operating parameter, that corrects a certain problem with a treater resolving one emulsion is totally inadequate to remedy the same problem with a different emulsion. This phenomena has been observed for almost 50 years in the electrical resolution of emulsions. In summary, it may be stated that identical electrical treater configurations react differently and also erratically (non-linearly), upon resolving emulsions having varying properties including relative amounts of internal and external phases, their chemical compositions, and the conductivity of the continuous phase.

Many reasons have been given for the unpredictable operation of the treaters with such emulsions. For example, a substantial quantity of dispersed water is collected between the electrodes in these treaters. Additionally, masses of water are collected between the edges of the energized electrode and the metal walls of the containing vessel. These masses of water result from hydraulics-flow patterns within the treater and/or the electric field effects upon the emulsion. The masses of water can align themselves to form highly conductive paths to electrical current. This phenomena is commonly termed "chaining". Chaining leads to the conduction of very heavy current flows between an energized electrode and adjacent grounded electrodes or metallic walls of the treater. These heavy currents produce an excessive loading upon the power transformer. The protective reactance decreases the voltage applied to the primary of the transformer which automatically results in a substantial decrease in the energization potential applied to these electrodes. As a result, the trapped water falls, thereby alleviating the chaining condition, but reducing the potential to a point below that required for coalescence. Many of these treaters are in "balanced" operation with a potential applied to the energized electrode which treats the emulsion at some reduced flow conditions to avoid encountering the chaining phenomena. A slight change in any operating condition makes the treater incapable of resolving the emulsion, and/or produces chaining which cause a substantial reduction in treating gradient in the electric field and resolution of the emulsion.

The energized and grounded electrodes can be spaced relatively far from one another or adjacent grounds, to avoid "chaining". Although avoiding chaining effects, the operation of the treater still is not always predictable. For example, it has been urged that the higher the potential applied to the energized electrode(s), the better the treater would resolve the emulsion subjected to it. This theory was not always found to be correct since an increase in potential which energized the electrodes in many instances would cause a relatively greater increase in the current drawn from the secondary of the transformer. This heavy demand would cause the protective reactance to decrease immediately the potential applied to the energized electrode(s). As a result, treating efficiency would not be improved even at an increase in power applied and consumed.

The high velocity design attempts to eliminate "chaining" hydraulically by using a velocity selected to keep the emulsion turbulent as it is injected into the field; the low velocity design by slowing the charge rate such that water falls from the electric field before "chaining" takes place.

Many types of emulsions, particularly the low API gravity, high viscosity crude oils, make the operation of conventional treaters very sensitive to adjustments in its operating parameters. For example, small changes in any of the operating conditions in the treater cause sudden and great changes in the resolution of emulsion. Furthermore, these changes are not predictable or uniform in magnitude. An upset in operation of the treater usually produces relatively large changes in the electrical field, and correspondingly, each of the energized electrode(s) increasingly consumes current from the power transformer.

The unpredictability of changes in the electrical system and their effect upon emulsion treating efficiency in conventional treaters has led to excessive power consumption and reduced treating efficiency under certain treating conditions. For example, emulsions formed of high viscosity, low API gravity crude oils, such as those produced by steam flooding or fire flooding procedures, are typical examples of the problem area. The conventional treaters are difficult to place into operation, and to operate, with these crude oils.

Moreover, in the prior art treaters described in the above listed patents, the treatment is dependent on the settling of the coalesced aqueous material drops. That is, these treaters are, in effect, electrically aided settlers. The settling velocity of the coalesced drop is therefore a limitation on the efficiency of the treater. This settling velocity obeys Stokes' law for water droplet settling, which may be expressed:

$$V = k \frac{r^2(P_p - P_h)}{v}$$

where:
V is the settling or terminal velocity of the falling water droplet;
r is the radius of the drop (assumed to be a sphere);
v is the viscosity of the oil through which the water is flowing;
$P_p$ is the density of the falling drop;
$P_h$ is the density of the oil through which the water is falling; and
k is a suitable constant for the system being resolved.

OBJECTS OF THE INVENTION

It is an object of the present invention to provide an electric treater for resolving emulsions which is not subject to the above discussed disadvantages.

Other objects will be apparent from the following description.

SUMMARY OF THE INVENTION

The above and other objects of the invention are accomplished by providing a treating apparatus for electrically resolving emulsions having immiscible aqueous and organic liquid phases, the aqueous phase being internal. The apparatus comprises (a) a metallic vessel having an emulsion inlet, an aqueous material outlet and an organic material outlet, the aqueous material outlet being in the bottom portion of the vessel; (b) distributor means positioned in the lower portion of the vessel above the aqueous material outlet and connected by conduit means to the emulsion inlet; (c) planar, permeable electrode means adapted to be energized, horizontally positioned in the vessel, spaced apart from the vessel walls and intermediate the distributor means and the collector means, the electrode being the only electrode means positioned in said vessel; (d) conductive means adapted to connect the electrode means with an electrical power source outside of the vessel; (e) insulating means for maintaining said conductive means electrically isolated from the vessel; and (f) means for controlling the level of aqueous material which collects in the bottom portion of the vessel, these means being adapted to maintain the level of the aqueous material at a position intermediate the distributor means and the electrode means.

The electrical power source means to which the electrode means is connected applies potential to the electrode means for establishing an electric field between the electrode means and the aqueous material surface, the potential being of sufficient intensity to resolve the emulsion immediately at the aqueous material surface. The electrical power source means is adjustable as to the electrical potential supplied by it. Preferably, the electrical power source means is adapted to supply a potential producing an emulsion treating gradient of between about 0.5 and about 4 kilovolts per inch, more preferably between about 0.75 and about 1.5 kilovolts per inch, between the electrode means and the aqueous material surface. A treating gradient of 1.5 kilovolts per inch is very suitable.

The electrical power source means is adapted to supply a potential producing a treating gradient between the electrode means and the aqueous material surface sufficient to make the emulsion conductive to current flow, but which potential is insufficient to ionize substances in the emulsion whereby small increases in the supplied potential produce disproportionately larger increases in current flow through the emulsion.

The treating apparatus preferably includes means for adjusting the vertical spacing between the electrode means and the aqueous material surface.

The treating vessel may be either horizontally or vertically elongated, preferably in cylindrical form. Spherical vessels may also be employed. With horizontally elongated vessels, the use of a collector in the upper part of the vessel, connected by conduit means to the organic material outlet, is advantageously employed. The preferred distributor means is the pan or trough type, more specifically, a distributor of the inverted pan type.

The present invention also encompasses a process for electrically resolving emulsions having immiscible aqueous and organic liquid phases, the aqueous phase being internal. The process comprises (a) maintaining a body of aqueous material in a treating vessel, the aqueous material serving as an electrical ground; (b) establishing an electric field between an energized horizontal planar permeable electrode and the surface of the body of aqueous material, the electrode being positioned above the aqueous material surface; (c) introducing the emulsion into the body of aqueous material; (d) allowing the emulsion to rise to the surface of the body of aqueous material; (e) supplying sufficient potential to the energized electrode to provide an emulsion treating gradient in the electric field of sufficient magnitude so that the aqueous phase content of the emulsion coalesces instantaneously at the aqueous material surface, thus resolving the emulsion, and the coalesced drops become part of the aqueous material surface with no settling required; the potential being insufficient to ionize substances in the emulsion whereby small increases in the applied potential produce disproportionately larger increases in current flows through the emulsion; (f) allowing the organic liquid phase to rise; and (g) withdrawing the organic liquid from the upper part of the treating vessel and the aqueous material from the lower part of the treating vessel.

In addition to providing greater electrical stability and efficiency than the prior art treaters discussed above, the present treater is not settling dependent. Therefore, it can operate with a reduced separation time and may be made shorter in its vertical dimension than the prior art treaters.

The present treating apparatus is especially useful for resolving emulsions formed between water and highly conductive, high viscosity and low API gravity crude oils. It has also been found to be extremely advantageous in a process for electrically resolving diluted bitumen emulsions to remove water and particulate minerals, as described and claimed in the Application of Robert B. Martin, Ser. No. 43,597, filed concurrently (May 29, 1979) with the present Application, the disclosure of which is incorporated herein by reference.

BRIEF DESCRIPTION OF THE DRAWINGS

Referring to the accompanying drawings:

FIG. 1 is a vertical section of an electric treater embodiment of this invention.

FIG. 2 is a cross-section taken along line 2—2 of the treater shown in FIG. 1.

FIG. 3 is a partial plan view of the energized electrode shown in FIG. 1, in the direction of line 3—3 thereof.

DESCRIPTION OF SPECIFIC EMBODIMENT

Figure 4:
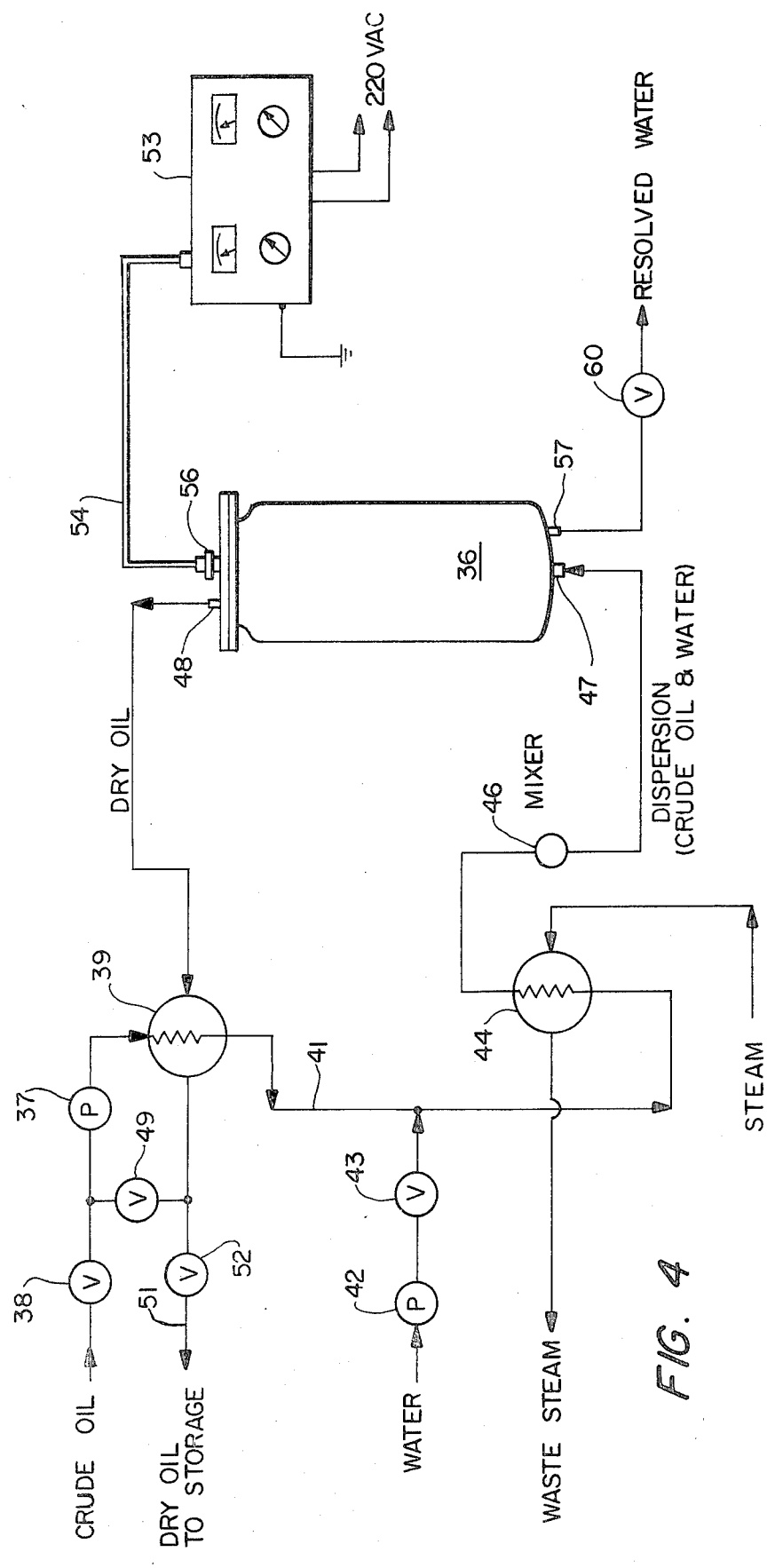
FIG. 4 is a diagrammatic representation of a small pilot oil dehydrating or desalting plant.

In FIGS. 1 and 2, there is shown an apparatus of the present invention formed of a metallic vessel 1 carrying emulsion inlet 2, aqueous material outlet 3 and organic material outlet 4. A level controller 6 actuated by a float 7 controls the flow of fluid from the outlet 3 by means not shown and thereby maintains water surface 8 at a relatively constant level within the vessel 1. The water surface 8 is the interface between the buld aqueous material in the lower portion of the vessel 1 and the organic material thereabove. A distributor 9, placed below the water surface 8, divides the incoming emulsion from the inlet 2 into a plurality of upwardly directed uniform flows. The emulsion flows upwardly from openings 11 to the water surface 8, then between the water surface 8 and an energized horizontally disposed electrode 12, and then toward the outlet 4. The water surface 8 serves as an electrically grounded electrode and may be characterized as a "water-surface electrode". The level controller 6 is adapted to maintain the water surface above the openings 11 in distributor 9, shown here as an inverted pan distributor.

The electrode 12, as shown in FIG. 3, is formed of rods 13 mounted transversely upon spaced supporting clamp bars 14 and 16. Since fluid can flow through the spaces between the rods 13, the electrode 12 may be termed "permeable". Other types of permeable electrodes, or foraminous electrodes may be employed instead of that shown. However, rods are preferred for their mechanical properties and also have the advantage of not presenting sharp edges where high voltage discharge can occur. The electrode 12 is supported from insulators 17 secured to the vessel 1 and is spaced apart from the vessel walls. It should extend substantially across the cross-section of the vessel 1, covering sufficient area so that an effective treating gradient is established throughout the electric field traversed by the emulsion flowing between the water-surface 8 and the energized electrode 12.

The insulators 17 may be supported for vertical adjustment so that the spacing between the electrode 12 and the water surface 8 may be varied to adjust the emulsion treating gradient. For this purpose, a threaded rod 18 connects to the insulators 17 and passes upwardly through spools 19 carried on the vessel 1. A hand wheel 21 threadedly engages the rod 18 exteriorly of the spools 19. A packing gland 22 located atop the spool 19 seals fluidly tight a polished section on the threaded rod 18. Thus, the hand wheel 21 is rotated to move the threaded rod 18 vertically which adjusts the vertical spacing between the energized electrode 12 and the water surface 8. Preferably, however, the distance between the electrode 12 and the water surface 8 is adjusted by adjusting float control 7 or otherwise adjusting water level controller 6.

The electrode 12 is energized from an external power source. Where alternating current is employed, the external power source may include an autotransformer 23 connected to a suitable source of power. The transformer 23 connects to a high voltage transformer 24 through a protective reactance 26. The secondary of the transformer 24 has one terminal grounded. The other terminal connects through an entrance bushing 27 into the vessel 1 and lead 28 connects to the energized electrode 12. An ammeter 29 in series with the high voltage lead 28 monitors the current flowing to the electrode 12. A volt meter 31 shunted across the high voltage secondary of the transformer 24 monitors the magnitude of the applied potential. Thus, the applied potential and current flow to energize the electrode 12 may be readily determined during operation of the apparatus.

A collector 32 connects to the outlet 4. The collector is shown here in the form of a pipe having a plurality of openings 33 through which fluid enters on passage to the outlet 4, although other forms of collectors may be employed. Preferably, the collector 32 extends the length of the electrode 12. With this arrangement in the vessel 1, the emulsion from the inlet 2 passes from the distributor 9 to the water surface 8, flows through the electric field between the energized electrode and the water surface 8, and then flows towards the outlet 4. The emulsion is resolved at the aqueous material surface, causing the internal aqueous phase to coalesce and become part of the body of aqueous material. Aqueous material is withdrawn from outlet 3.

The optimum distance separating the energized electrode 12 and the walls of vessel 1 will depend largely on the nature of the emulsion which it is desired to treat and the electrical potential which will be employed. Such separation should be such that the critical voltage of the emulsion positioned between electrode 12 and the grounded walls of vessel 1 will not be equalled or exceeded by the potential applied to the electrode, the critical voltage being that at which the emulsion becomes highly conductive. By observing this criterion, it is unnecessary to electrically insulate any part of the vessel walls. This critical voltage phenomenon is believed due to the fact that at higher voltages, substances present in the organic phase of the emulsion ionize, causing small increases in potential to produce large increases in current flows. The use of spacing greater than the minimum sufficient separation will reduce the power consumed in the treater. Similarly the distance separating the electrode 12 and the water surface should be such so that the emulsion positioned between them will not be subjected to a voltage gradient above the critical voltage.

In operation, any potential below the critical voltage could be applied to the energized electrode 12 which is adequate to establish an electric field of sufficient intensity to resolve the emulsion during traverse of the electric field. Since the arrangement of the apparatus produces linear responses in power consumed relative to applied potential during operation, the potential applied to the electrode 12 can be adjusted to provide any desired treating efficiency within the apparatus. The potential could be adjusted so that the emulsion is resolved a small distance from the energized electrode 12, or at some location intermediate the energized electrode 12 and the water surface 8. The emulsion, under these potentials, can form an internal "pad" wherein the aqueous material is of sufficient concentration to serve as a grounded electrode which appears to be a second water-surface electrode in function.

It has been found that the internal "pad" can be eliminated by reducing the emulsion flow rate, increasing the electrode potential, or raising the water level closer to the electrode. The elimination of the internal "pad" indicates that a sufficient potential is being applied to the electrode 12 so that substantially all treating occurs immediately at the aqueous material surface 8. Coalescence of the aqueous phase content thereby takes place instantaneously as soon as the emulsion breaks the aqueous material surface, with no settling required. The potential applied to the energized electrode 12 can be varied proportionally to the emulsion flow through the distributor 9 into the vessel 1 for maintaining treatment at the water surface 8 for all operable rates of emulsion flow into the vessel 1. The aqueous material level may also be used as an operating control by interlocking it with the power source. The system would automatically seek and hold the highest practical water level to assure optimization.

The potential upon the electrode 12 may be adjusted for the highest rate of emulsion flow within the vessel 1. Thus, the current flow established at such potential will accommodate the maximum capacity of emulsion throughput of the apparatus. These treating conditions will maintain effective treating between the electrode 12 and the water surface 8 at the maximum rate of emulsion flow. The treating occurs at the water surface 8 for all lesser flow rates of emulsion throughput in the vessel 1.

In the majority of situations, the apparatus can be operated with a potential applied to the energized electrode 12 sufficient to effect an emulsion treating gradient between about 0.5 and about 4 kilovolts per inch spacing between the electrode 12 and the water surface 8. In many practical operations, an emulsion treating gradient of about 1.5 kilovolts per inch spacing between these electrodes has been effective in resolving crude oil-water emulsions. However, a specific range of such potential gradients is not universally applicable since emulsion characteristics vary significantly. This emulsion treating gradient must be sufficient to coalesce the emulsion. This gradient must, however, not reach or exceed the point where small increases in potential produce disproportionately large increases in current flow through the emulsion traversing the electric field between the energized electrode 12 and the water surface 8.

Thus, the emulsion treating gradient is preferably set by adjusting the applied potential to that sufficient to resolve substantially all of the emulsion at the water surface 8 but insufficient to cause excessive current flows.

Instead of the horizontally elongated treating vessel shown in FIGS. 1 and 2 and described above, a vertically elongated or spherical vessel may be employed. Vertically elongated treaters are useful for low treating rates where a small electrode is required. When such vessels reach a diameter of ten feet to obtain the desired electrode area, a horizontally elongated treater becomes cheaper. Spherical treaters have certain theoretical advantages but are expensive and difficult to transport.

Figure 5:
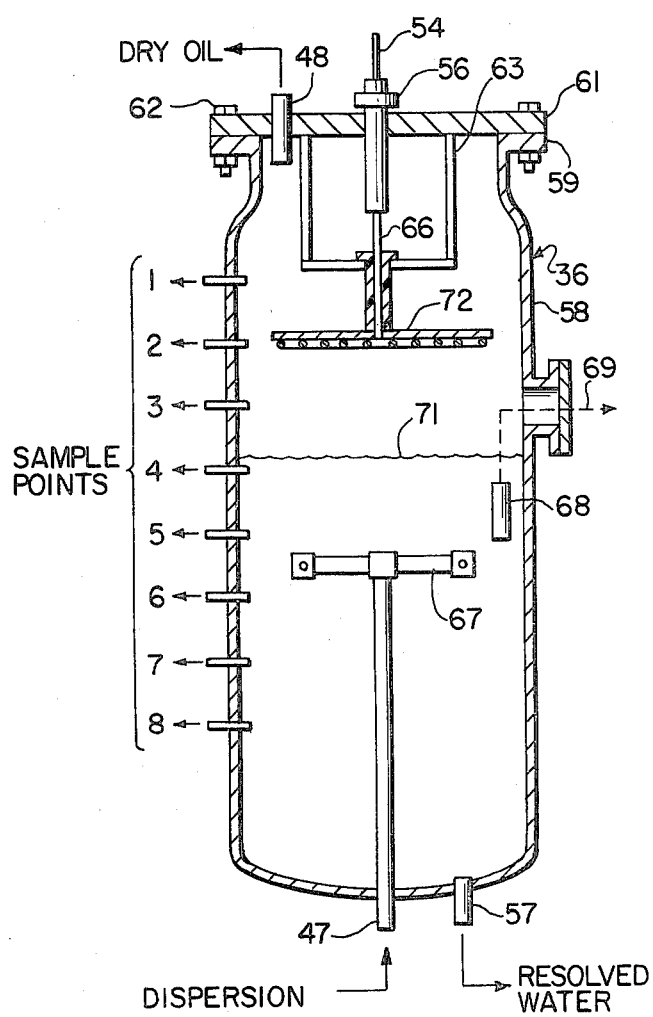
FIG. 5 is a vertical section of the electric treater employed in the plant shown in FIG. 4.
Figure 10:
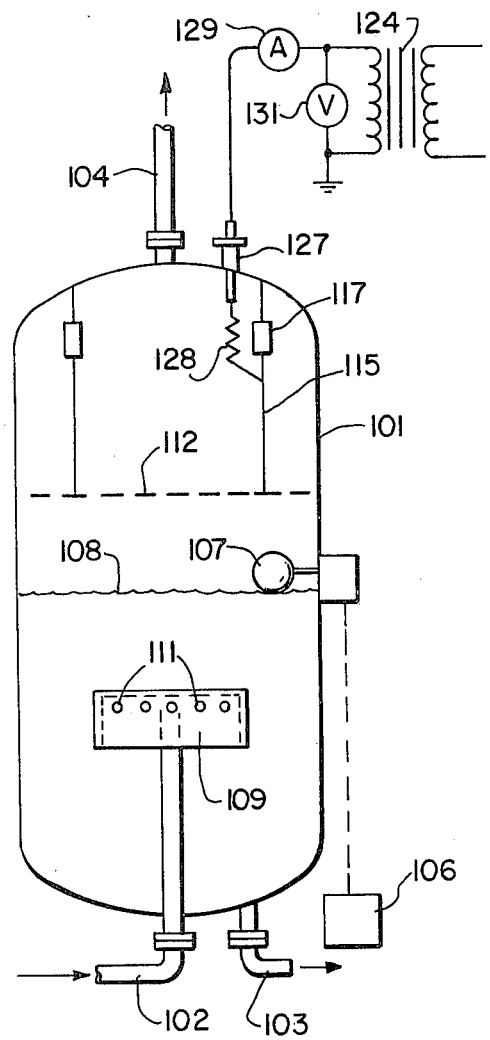
FIG. 10 is a diagrammatic representation of another embodiment of an electric treater of this invention.

Vertically elongated treaters up to ten feet in diameter do not require a collector. FIGS. 5 and 10, described below, show such treaters.

FIG. 4 is a diagrammatic representation of a pilot plant employing the vertical treater of FIG. 5 and used to test the system of the present invention. The plant provided crude oil dehydrating or desalting operations. The plant included the treater (desalter) 36 which received a dispersion formed of a mixture of crude oil and water. The "wet" crude oil was passed through a metering valve 38 and a pump 37 into a heat exchanger 39. The heated crude oil, from the heat exchanger 39, flowed into a manifold 41. Water, such as fresh or potable water, could be sent through a pump 42 and a metering valve 43 into the manifold 41. The crude oil and water were passed through a heat exchanger 44 and then into a mixer 46 which dispersed the water within the crude oil. The mixer 46 was a pressure-loaded mixing valve. The dispersion of crude oil and water passed from the mixer 46 to the inlet 47 of the treater 36.

The crude oil and water in the heat exchanger 44 were heated to suitable temperatures that permit the dispersion to be electrically resolved. Temperatures in the range of between 160° and 300° F. were acceptable for this purpose. The heat exchanger 44 utilized steam, from a steam generation source, in heat exchange with the crude oil and water. The steam from the heat exchanger 44 was waste steam but it could be utilized further if desired.

The dispersion was electrically resolved in the treater 36. The dehydrated or treated crude oil was removed from the treater 36 through the outlet 48. The dehydrated crude oil flowed from the outlet 48 at approximately the temperature of the dispersion entering the inlet 47. Therefore, it provided a source of sensible heat which was employed to preheat the crude oil entering the manifold 41. For this purpose, the "wet" crude oil was heated by the dehydrated crude oil in the heat exchanger 39. From the heat exchanger 39, the dehydrated crude oil was sent to suitable storage through outflow line 51, provided with valve 52. Valve 49 provides for transfer of oil between the oil feed and outflow lines for recycling and/or other purposes.

When the treater 36 performed desalting operations, a small amount of water was introduced into the manifold 41 to be mixed intimately into the "wet" crude oil. The amount of water generally was uncritical. Any amount of water, e.g., between 5 and 10%, could be added to the crude oil pursuant to everyday practices. If the crude oil was only to be dehydrated, no water was mixed with the "wet" crude oil. The water resolved from the crude oil within the treater 36 was removed through outlet 57, provided with valve 60.

The treater 36 employed a power supply 53 which produced high potential, alternating current voltages. The power supply 53 was connected to a 220 volt (AC) service line. The high voltage output of the power supply 53 was transferred through an insulated lead 54 and entrance bushing 56 into the treater. The power supply 53 included an integral protective reactance that limited excessive currents which could damage the components providing the high voltages. The power supply 53 was adjustable as to the output voltage, and also as to amount of input power consumed. The output voltage was adjustable in the range from zero to approximately 35 kilovolts. The input power was adjustable to limit current consumed in the range from 5 to 125 kva. The power supply 53 also provided meter readouts of the high voltage applied to the electrode within the treater 36 and of the current consumed in the treater at the applied high voltage. Thus, the energization of the electrode by the power supply 53 could be carefully regulated and monitored in both potential and current magnitudes.

Referring now to FIG. 5, the treater 36 was formed of a 2 foot in diameter steel vessel approximately 8 feet in length. The vessel 58 carried an upper flange 59 on which was secured a top flange 61 by bolts 62. The inlet 47 and outlets 48 and 57 were $1\frac{1}{2}$ inch steel pipe secured into the vessel 58. An entrance bushing 56 passed through the top flange 61 and extended into the interior of the vessel 58. A Teflon rack 63 provided the support for a planar energized electrode 72. The electrode 72 was suspended from the rack 63 by a Teflon covered steel rod 66. The rod 66 was connected to the lead 54 via the entrance bushing 56. The electrode 72 resided 16 inches below the flange 59.

Eight sample points, Nos. 1-8, were provided in the vessel 58 and spaced six inches vertically apart from one another. Sample point No. 1 was spaced ten inches below the flange 59. Sample point No. 2 was on the same level as the electrode 72.

The dispersion, a certain "wet" crude oil supplied through the inlet 47, was flowed through a distributor 67 residing 35 inches above the bottom of the vessel 58. The distributor 67, located between sample points Nos. 5 and 6, was formed from four equal lengths of 2 inch steel pipe arranged in the horizontal as a cross. These pipes carried a pipe tee mounted horizontally at their free ends. The distributor 67 ejected dispersion uniformly, both horizontally and vertically, across substantially the entire cross-section of the treater 36.

The treater 36 included a conventional air-operated level control system activated by a float 68. The system interconnected with conventional motor valve, not shown, at the outlet 57 by conduits displayed by the chain line 69. The level control system maintained an oil-water interface 71 at a fixed but adjustable level within the treater 36. The interface 71 was generally maintained a few inches above the distributor 67. In this arrangement, the water surface (interface 71) provided a grounded water-surface electrode in the treater 36. The interface 71 could be raised and lowered relative to the electrode 72 with the level control system.

The distance separating the electrode 72 from the nearest metallic grounds, i.e., the side walls of the vessel 58, was sufficient that the current-voltage load lines of the treater 36 substantially coincided in straight line functions (1) until substantially maximum resolution of the crude oil could be obtained at some elevated potential, (2) while electrically treating the "wet" crude oil, and (3) when filled with the dehydrated crude oil. The distance between the electrode 72 and the water surface at the interface 71 was variable up to 35 inches, and correspondingly produced a certain treating gradient for a given electrode energizing potential.

Figure 6:
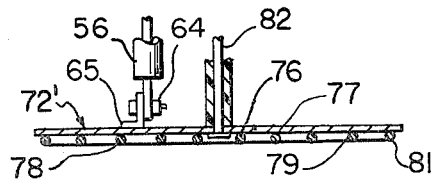
FIG. 6 is a vertical section of the electrode and its supporting structure employed in the treater of FIG. 4.
Figure 7:
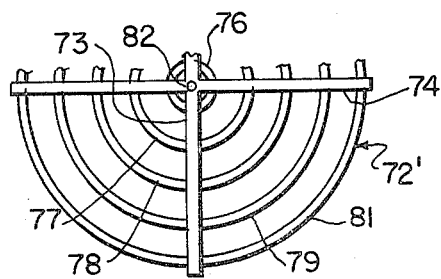
FIG. 7 is partial horizontal plan view of the electrode of FIG. 6.

The details of a suitable planar electrode 72' are shown in FIGS. 6 and 7. The electrode 72' was formed by steel strap members 73 and 74 secured together as a cross. Five annular rods 76, 77, 78, 79 and 81 of $\frac{3}{8}$ inch steel were secured by welding to the straps 73 and 74. The rod 76 was formed with a diameter of $2\frac{1}{2}$ inches. The remaining electrode rods were spaced $1\frac{1}{4}$ inches, on centers, from each other and from the rod 76. The electrode 72' had a vertical dimension of approximately 1 inch and an exterior maximum diameter of $13\frac{1}{2}$ inches. The electrode 72' was supported from the Teflon rack 63 by a Teflon-covered, support rod 82. The entrance bushing 56 in the flange 61 was moved to an off-center position. Its lower extremity connected directly by bolt 64 to an angle 65 carried upon the electrode 72'.

Figure 8:
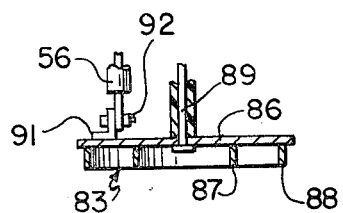
FIG. 8 is a vertical section of an alternative electrode and its supporting structure which may be employed in the treater of FIG. 4.
Figure 9:
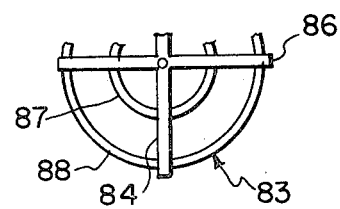
FIG. 9 is a partial horizontal plan view of the electrode of FIG. 8.

FIGS. 8 and 9 illustrate an alternative form of planar electrode, generally designated 83. The electrode 83 included straps 84 and 86 welded into the form of a cross. Upon the straps were mounted steel bands 87 and 88. These bands had a vertical dimension of approximately $\frac{3}{4}$ inch and were formed from 1/16 inch thick spring steel. The maximum diameter of the electrode 83 was 8 inches. The band 87 had a diameter of 4 inches and the band 88 had a diameter of 8 inches. The electrode 83 was supported by a Teflon covered rod 89 from the rack 63. The bushing 56 was electrically connected to angle 91 on the electrode 83 by bolt 92.

Two electrode embodiments have been shown for use in the treater 36. However, it will be apparent that other electrode configurations, suitably dimensioned in accordance with the above indicated criteria, can be employed.

The treater 36 was operated in extensive tests with a "wet" crude oil identical to one being desalted and dehydrated in a 60,000 barrel per day commercial desalter in California. The crude oil was a blend of several California crudes composited in pipe lining to a refinery. It has the following characteristics: a 22.5° API gravity at 60° F., a 1.3% Vol. BS&W content, a 1.5% Vol. water-by-distillation content, and a chloride content of approximately 45 pounds per 1000 barrels. Fresh water was added to the crude oil in an amount of 10% by volume of the crude oil supplied to the treater 36. The mixer 46 operated with a 10 lb. pressure differential across a 2 inch pressure-loaded mixing valve. The crude oil and water appeared to be thoroughly mixed to form a "tight" water-in-oil dispersion. The power supply 53 energized the electrodes in the treater 36 at various high voltages (AC).

The first tests were in the treater 36 using the electrode 72' positioned at the level of sample point No. 2. The distributor 67 resided between sample points Nos. 5 and 6. The dispersion had a temperature of 200° F. For practical purposes, the load line was a linear function within test operations.

The planar electrode 72' was energized at 16 and 21 kilovolts and the water-surface at interface 71 was maintained immediately above sample point No. 4. This arrangement resulted in the resolution of the dispersion to produce a dehydrated crude oil having 1.3 and 0.9% BS&W contents, respectively. The water surface was then raised to above sample point No. 3. Then, 20 and 22.2 kilovolts were applied to the electrode 72'. The treater 36 produced a dehydrated crude oil having a BS&W (bottom sediment and water) content of 0.9 in both runs. The electric field was sufficiently intense to resolve all, substantially, of the dispersion at the water-surface at the interface 71. The BS&W content of the crude oil at the several sample points was taken and tabulated in the following Table 1.

It will be seen from the test data that the treater 36 operated in a manner for resolving dispersions in accordance with the present invention. Suitable dimensioning and spacing of the energized electrode and treating with an electric field adjacent a water-surface electrode produces a treating system with a linear response in current flow for each variation in applied voltage. Sufficient potential applied to the energized electrode permits substantially all of the dispersion to be resolved immediately at the water surface. This characteristic provided any desired treating conditions, including optimum, for resolving any dispersion.

However, due to its small scale, treater 36 has a high ratio of electrode edges to electrode area and hence is not as efficient as a larger treater with a low ratio of such edges to area.

In FIG. 10, there is shown in diagrammatic representation, a vertically elongated electric treater of this invention. This treater includes a vertically elongated generally cylindrical metallic vessel 101 having an emulsion inlet 102, aqueous material outlet 103 and organic material outlet 104. A level controller 106, shown here as actuated by a float valve 107 (although other devices known in the art may be employed for this purpose) controls the flow of aqueous material from the outlet 103 by means not shown and thereby maintains the water surface 108 at a relatively constant level within the vessel 101. The water surface 108 is the interface between the body of aqueous material in the lower portion of the vessel 101 and the emulsion or organic material thereabove. An inverted pan distributor, placed below the water surface 108, divides the incoming emulsion from the inlet 102 into a plurality of upwardly directed uniform flows. The emulsion flows upwardly from openings 111 to the water surface 108, then between the water surface 108 and an energized horizontally disposed permeable planar electrode shown diagrammatically at 112, and then toward the outlet 104. The level controller 106 is adapted to maintain the water surface above the openings 111 in distributor 109.

The electrode 112 extends substantially across the cross-section of the vessel 101, but is spaced apart from the vessel walls. It may be generally similar in design to the electrodes shown in FIGS. 6 and 7 or 8 and 9, although in this embodiment it is supported by rods 115 from insulators 117 secured to the top of vessel 101.

TABLE 1

| Temp | Voltage Applied (kv-ac) | Current (ma) | OH % BS&W | #1 | #2 | #3 | #4 | #5 | #6 | #7 |
|---|---|---|---|---|---|---|---|---|---|---|
| 200 | 16 | 1.3 | 1.3 | 1.0 | 8.8 | W | | | | |
| 200 | 21 | 40 | 0.9 | 1.2 | 0.7 | 7.2 | W | | | |
| 200 | 20 | 46 | 0.9 | 0.9 | 1.0 | W | | | | |
| 200 | 22.2 | 36 | 0.9 | 1.0 | 0.5 | W | | | | |

The same tests were again repeated using the planar electrode 83. The results of these tests are shown in the following TABLE 2.

| gpm | Temp | Voltage Applied (kv-ac) | Current (ma) | OH % BS&W | #1 | #2 | #3 | #4 | #5 | #6 | #7 | #8 |
|---|---|---|---|---|---|---|---|---|---|---|---|---|
| 7 | 200 | 24.6 | 28.0 | 1.0 | 1.3 | 1.7 | W | | | | | |
| 7 | 200 | 20.0 | 24.0 | 1.2 | 1.1 | 1.2 | W | | | | | |
| 7 | 200 | 16.0 | 23.5 | 1.2 | 1.1 | 2.4 | 50 | W | | | | |
| 7 | 200 | 12.0 | 16.0 | 1.5 | 1.8 | 3.0 | 40.0 | W | | | | |

It will be noted from the data that the electrode 83 resolved the dispersion exceptionally well. It displayed the same characteristics as found in the electrode 72'.

Other types of permeable or foraminous electrodes may be employed instead of those of FIGS. 6-9.

The distance between the electrode 112 and the water surface 108 may be varied by adjusting float control 107 or otherwise adjusting water level controller 106.

The electrode 112 is energized by a suitable power source which, as shown, includes a high voltage transformer 124, the primary of which is connected to an alternating current power supply. The high voltage transformer secondary has one terminal grounded, the other terminal connecting through an entrance bushing 127 to lead 128 inside the vessel 101. Lead 128 connects to the energized electrode 112. An ammeter 129 in series with the high voltage lead 128 monitors the current flowing to the electrode 112 and a volt meter 131 shunted across the high voltage transformer secondary monitors the applied potential.

With this arrangement in the vessel 101, the emulsion from the inlet 102 passes from the distributor 109 to the water surface 108, flows through the electric field between the energized electrode and the water surface 108, which serves as an electrically grounded electrode, then flows toward the outlet 104. The emulsion is resolved at the aqueous material surface, causing the internal aqueous phase to coalesce and become part of the body of aqueous material. Aqueous material is withdrawn from outlet 103.

The treater of FIG. 10 may suitably have a height of nine feet. The top of the distributor 109 may suitably be located three feet above the bottom of the vessel 101 and the electrode 112 four feet below the top of the vessel. The distance between the level of the water surface 108 and the electrode 112 may suitably be varied between 4 and 11 inches.

A roughly comparable vertically elongated conventional treater would have two horizontally disposed electrodes separated by a distance of 4 to 11 inches, the lower electrode being spaced three feet above the aqueous material surface to allow for settling, the aqueous material surface being five feet above the bottom of the vessel. Such a treater would thus be four feet taller than the treater of FIG. 10.

The use of unidirectional current in the treaters of the present invention when employed for the resolution of diluted bitumen emulsions is described in the co-pending Application of Robert B. Martin, referred to above.

The system of the present invention has been described for emulsions (including dispersions resembling emulsions) where the aqueous material has a higher specific gravity than the organic liquid. However, the present system can be used where the organic liquid has a higher specific gravity than the aqueous material. In this circumstance, the apparatus is inverted. In the process, the aqueous material would gravitate upwards above a layer of organic liquid material. The application of the present invention would remain the same. The relative directions and positions as referred to in the description and claims (top, bottom, etc.) are used to describe the apparatus as it is most commonly used, and the claims are to be understood as covering the same apparatus when used in an inverted position. Certain tar emulsions may be mentioned as examples where the organic liquid has a higher specific gravity than the aqueous material. The resolutions of such emulsions in conventional two-electrode treaters is described in U.S. Pat. Nos. 2,072,917 and 2,072,918.

From the foregoing, it will be seen that there has been described a treating apparatus and process well suited for resolving emulsions by means of electric fields. The foregoing description of the invention is to be taken as illustrative and not limitative. Various changes may be made in the present invention without departing from its spirit.

We claim:

1. Apparatus for electrically resolving an emulsion having immiscible aqueous and organic liquid phases, the aqueous phase being internal, comprising:
   (a) a metallic vessel having an emulsion inlet, an aqueous material outlet and organic material outlet means, said aqueous material outlet being at the bottom portion of said vessel and said organic material outlet means being in the upper portion of said vessel;
   (b) distributor means positioned in the lower portion of said vessel above said aqueous material outlet and connected by conduit means to said emulsion inlet;
   (c) planar, permeable electrode means adapted to be energized, horizontally positioned in said vessel spaced apart from the vessel walls and intermediate said distributor means and said organic material outlet means, said electrode means being the only electrode means positioned in said vessel;
   (d) conductive means adapted to connect said electrode means with an electrical power source outside of said vessel;
   (e) insulating means for maintaining said conductive means electrically isolated from said vessel; and
   (f) means for controlling the level of aqueous material which collects in the bottom portion of said vessel, said means adapted to maintain the level of said aqueous material at a position intermediate said distributor means and said electrode means.

2. The apparatus of claim 1 comprising also an electrical power source means for applying electrical potential to said electrode means (c) for establishing an electric field between said electrode means and the aqueous material surface, said electrical potential being of sufficient intensity to resolve said emulsion at said aqueous material surface.

3. The apparatus of claim 2 wherein said electrical power source means is adjustable as to electrical potential supplied by it.

4. The apparatus of claim 2 wherein said electrical power source means is adapted to supply an electrical potential producing an emulsion treating gradient of between about 0.5 and about 4 kilovolts per inch between the electrode means (c) and the aqueous material surface.

5. The apparatus of claim 4 wherein said treating gradient is between about 0.75 and about 1.5 kilovolts per inch.

6. The apparatus of claim 4 wherein said treating gradient is about 1.5 kilovolts per inch.

7. The apparatus of claim 2 wherein said electrical power source means is adapted to supply an electrical potential producing an emulsion treating gradient between the electrode means (c) and the aqueous material surface sufficient to make the emulsion conductive to current flow, but which potential is insufficient to ionize substances in the emulsion whereby small increases in the supplied potential produce disproportionately larger increases in current flow through the emulsion.

8. The apparatus of claim 1 comprising also means for adjusting the vertical spacing between the electrode means (c) and the aqueous material surface.

9. The apparatus of claim 1 wherein said metallic vessel is horizontally elongated and said organic material outlet means includes collector means positioned in the upper part of said vessel.

10. The apparatus of claim 1 wherein said metallic vessel is vertically elongated.

11. The apparatus of claim 1 wherein said distributor means comprises a trough or pan distributor.

12. A process for electrically resolving an emulsion having immiscible aqueous and organic liquid phases, the aqueous phase being internal, comprising:
 (a) maintaining a body of aqueous material in a treating vessel, said aqueous material serving as an electrical ground;
 (b) establishing an electric field between an energized horizontal planar permeable electrode and the surface of said body of aqueous material, said electrode being positioned above said aqueous material surface;
 (c) introducing the emulsion into said body of aqueous material;
 (d) allowing said emulsion to rise to the surface of said body of aqueous material;
 (e) supplying sufficient potential to said energized electrode to provide an emulsion treating gradient in the electric field of sufficient magnitude so that the aqueous phase content of said emulsion coalesces instantaneously at said aqueous material surface, thus resolving the emulsion, and the coalesced drops become part of the aqueous material surface with no settling required; said potential being insufficient to ionize substances in the emulsion whereby small increases in the applied potential produce disproportionately larger increases in current flows through the emulsion;
 (f) allowing the organic liquid phase to rise; and
 (g) withdrawing said organic liquid from the upper part of said treating vessel and said aqueous material from the lower part of said treating vessel.

13. The process of claim 12, wherein said emulsion treating gradient is between about 0.5 and about 4 kilovolts per inch.

14. The process of claim 12, wherein said emulsion treating gradient is between about 0.75 and about 1.5 kilovolts per inch.

15. The process of claim 12, wherein said emulsion treating gradient is about 1.5 kilovolts per inch.

* * * * *